United States Patent
Beaupre et al.

(10) Patent No.: US 9,796,249 B2
(45) Date of Patent: Oct. 24, 2017

(54) BUS SIDE WINDOW ASSEMBLY AND METHOD

(71) Applicant: CORPORATION MICRO BIRD INC., Drummondville (CA)

(72) Inventors: Hugues Beaupre, Drummondville (CA); Pascal Chabot, Drummondville (CA)

(73) Assignee: CORPORATION MICRO BIRD INC., Drummondville (CA)

( * ) Notice: Subject to any disclaimer, the term of this patent is extended or adjusted under 35 U.S.C. 154(b) by 0 days.

(21) Appl. No.: 14/937,102

(22) Filed: Nov. 10, 2015

(65) Prior Publication Data
US 2016/0129764 A1 May 12, 2016

Related U.S. Application Data

(60) Provisional application No. 62/077,387, filed on Nov. 10, 2014.

(51) Int. Cl.
*B60J 1/10* (2006.01)
*B60J 1/00* (2006.01)
*B62D 65/02* (2006.01)
*B62D 31/02* (2006.01)
*B62D 65/06* (2006.01)

(52) U.S. Cl.
CPC ............... *B60J 1/10* (2013.01); *B60J 1/006* (2013.01); *B62D 31/02* (2013.01); *B62D 65/024* (2013.01); *B62D 65/06* (2013.01)

(58) Field of Classification Search
CPC ... B60J 1/10; B60J 1/006; B60J 1/004; B62D 31/02; B62D 65/024; B62D 65/06
See application file for complete search history.

(56) References Cited

U.S. PATENT DOCUMENTS

| | | | | | |
|---|---|---|---|---|---|
| 5,915,780 | A | * | 6/1999 | Kobrehel | B60J 10/70 296/146.15 |
| 6,000,746 | A | * | 12/1999 | Ito | B60J 1/005 296/146.15 |
| 7,077,459 | B2 | * | 7/2006 | Toth | B62D 31/02 296/178 |

OTHER PUBLICATIONS

Collins Bus Corporation, Products: Model SL400, http://www.collinsbuscorp.com/products.php?id=1.
Collins Bus Corporation, Products: Model SH400, http://www.collinsbuscorp.com/products.php?id=2.
Collins Bus Corporation, Products: Model SL408, http://www.collinsbuscorp.com/products.php?id=3.
Collins Bus Corporation, Products: Model DH400, http://www.collinsbuscorp.com/products.php?id=4.
Collins Bus Corporation, Products: Model DE416, http://www.collinsbuscorp.com/products.php?id=5.
Collins Bus Corporation, Products: Model DH416, http://www.collinsbuscorp.com/products.php?id=6.
(Continued)

*Primary Examiner* — Glenn Dayoan
*Assistant Examiner* — Melissa A Black
(74) *Attorney, Agent, or Firm* — Gwendoline Bruneau (57) ABSTRACT

A side window assembly for a vehicle comprising a cabin, a chassis window frame rail, and a body with a door integral therewith and aligned with the chassis rail axis, comprising a window frame fitted within an opening between a front post of the door and an internal edge of the cabin independently of an internal fender panel and of a fender of the cabin, and a glazing, secured to the window frame to fill the opening.

10 Claims, 11 Drawing Sheets

(56) References Cited

OTHER PUBLICATIONS

Collins Bus Corporation, Products: Model DH416WR, http://www.collinsbuscorp.com/products.php?id=7.
Collins Bus Corporation, Products: Model DH500, http://www.collinsbuscorp.com/products.php?id=8.
Collins Bus Corporation, Products: Model DH516, http://www.collinsbuscorp.com/products.php?id=9.
Collins Bus Corporation, Products: Model DE416WR, http://www.collinsbuscorp.com/products.php?id=10.
Collins Bus Corporation, Products: Model DE516, http://www.collinsbuscorp.com/products.php?id=11.
Collins Bus Corporation, Products: Model DE516WR, http://www.collinsbuscorp.com/products.php?id=12.
Collins Bus Corporation, Products: Model MFSAB, http://www.collinsbuscorp.com/products.php?id=13.
Collins Bus Corporation, Products: Model MPV—Multipurpose Passenger Vehicle, http://www.collinsbuscorp.com/products.php?id=18.
Collins Bus Corporation, Products: Model Compressed Natural Gas—CNG, http://www.collinsbuscorp.com/products.php?id=19.
Collins Bus Corporation, Products: Model SH408, http://www.collinsbuscorp.com/products.php?id=20.

* cited by examiner

BUS SIDE WINDOW ASSEMBLY AND METHOD

CROSS REFERENCE TO RELATED APPLICATIONS

This application claims benefit of U.S. provisional application Ser. No. 62/077,387, filed on Nov. 10, 2014. All documents above are incorporated herein in their entirety by reference.

FIELD OF THE INVENTION

The present invention relates to buses. More specifically, the present invention is concerned with a bus side window assembly and method.

BACKGROUND OF THE INVENTION

Cutaway van chassis are used by second stage manufacturers for a wide range of completed motor vehicles. They are usually based upon incomplete vans made by manufacturers and, to these incomplete vans, a second stage manufacturer adds specific equipment and completes the vehicle. Common applications of this type of vehicles include small trucks, school buses, recreational vehicles, minibuses, and ambulances for example.

A Type A bus as known in the art is a van conversion or bus or multi-passenger vehicle for example, constructed utilizing a cutaway front section vehicle with a driver's door and an opposite passenger's door. A cutaway chassis generally features a cabin, ending immediately behind the driver and front passenger seats, and allowing for these two doors.

Figure 1A:
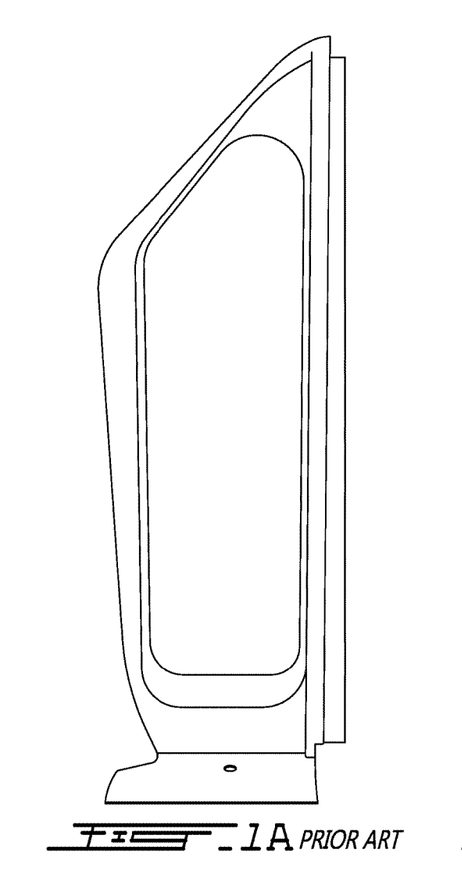
FIG. 1A shows an internal part of a window assembly of a single rear wheel (SRW) vehicle as known in the art.
Figure 1B:
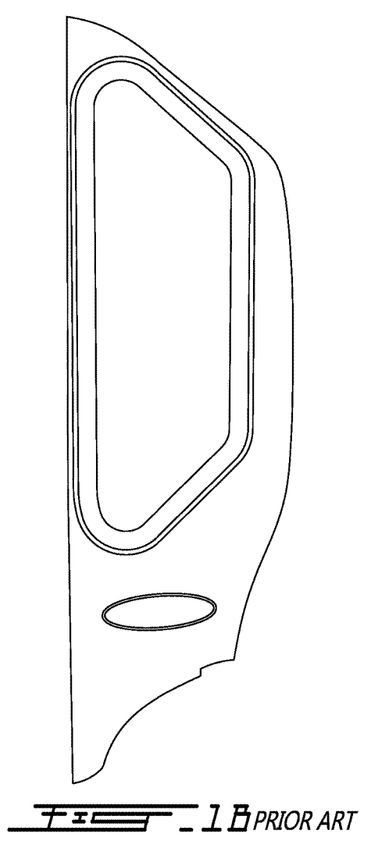
FIG. 1B shows an external part of a window assembly of a single rear wheel (SRW) vehicle as known in the art.

As shown in FIG. 1, a side window assembly for a single rear wheel vehicle (SRW) as known in the art comprises two parts: an internal part (see FIG. 1A) and an external part (see FIG. 1B), both typically molded in a composite material. These two parts are individually installed on the vehicle, and then a glass part or glazing (G) is installed using a gasket.

Figure 2A:
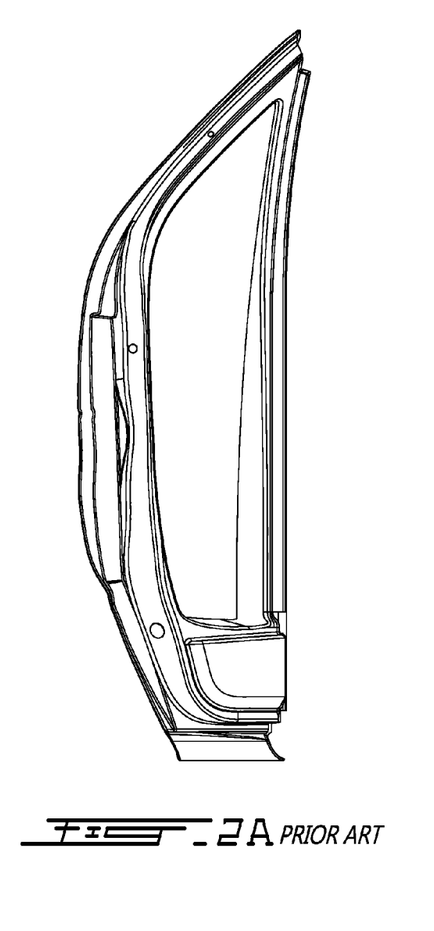
FIG. 2A shows an internal part of a window assembly of a dual rear wheels (DRW) vehicle as known in the art.
Figure 2B:
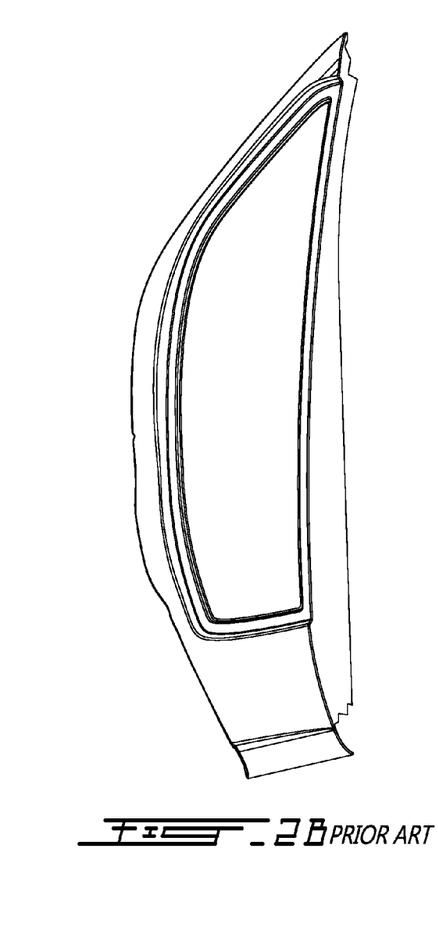
FIG. 2B shows an external part of a window assembly for a dual rear wheels (DRW) vehicle as known in the art.

As shown in FIG. 2, a window assembly for a dual rear wheel (DRW) vehicle as known in the art also comprises two parts: an internal part (FIG. 2A) and an external part (FIG. 2B) both typically molded in a composite material. The two molded parts are first preassembled, and are then installed as a whole on the vehicle before a glass part is glued, from the outside of the vehicle, on the assembly joint of the two parts.

Figure 1C:
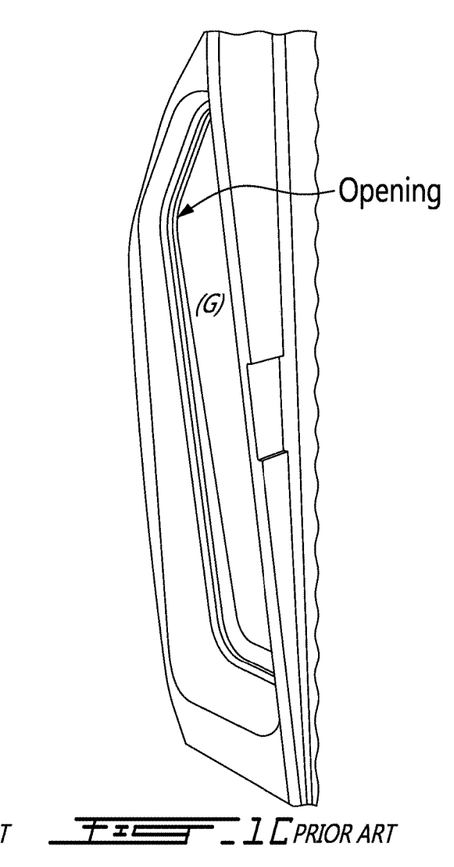
FIG. 1C is a view of a window assembly of a single rear wheel (SRW) vehicle as known in the art, from the inside of the vehicle.

Depending on the relative alignment between the chassis rails and the cabin, a gap (see FIG. 1C) may occur between the internal part and the glass part (G) or between the external part and the fender of the cabin for example; indeed, the installation and robustness of the windows is dependent on chassis misalignment, as these windows rest on the front fender of the cabin 12 over an internal edge of the cabin. Moreover, the installation and robustness of such two-parts windows is always dependant on dimensional variations of the two parts, and, in the case of DRWs in particular, dependant on the precision of the preassembly of the two parts.

There is still a need in the art for a bus side window assembly and method.

SUMMARY OF THE INVENTION

More specifically, in accordance with the present invention, there is provided a side window assembly for a vehicle comprising a cabin, a chassis window frame rail, and a body with a door integral therewith and aligned with the chassis rail axis, comprising a window frame fitted within an opening between a front post of the door and an internal edge of the cabin independently of an internal fender panel and of a fender of the cabin; and a glazing secured to the window frame to fill the opening.

There is further provided a method for installing a window assembly in a vehicle comprising a cabin having an internal edge forming generally three sides of an opening, a chassis window frame rail, and a body with a door integral therewith and aligned with a chassis rail axis, a front post of the door forming a fourth side of the opening, the method comprising securing a window frame within the opening between the front post of the door and the internal edge of the cabin, independently of an internal fender panel and of a fender of the cabin; and securing a glazing to the surface of the window frame.

There is further provided a vehicle comprising a cutaway chassis comprising a cabin and a chassis window frame rail, and a body generally aligned with the chassis rail axis, the cabin comprising a B pillar on a first side of the vehicle, an internal edge of the cabin forming sides of an opening on an second side of the vehicle opposite the first side of the vehicle, the body comprising a door integral therewith on the second side of the vehicle, a front post of the door closing the opening, the vehicle further comprising a one-piece window frame secured to the front post and to the internal edge of the cabin within the opening, independently of an internal fender panel and of a fender of the cabin, and supporting a glazing spanning the opening.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 3:
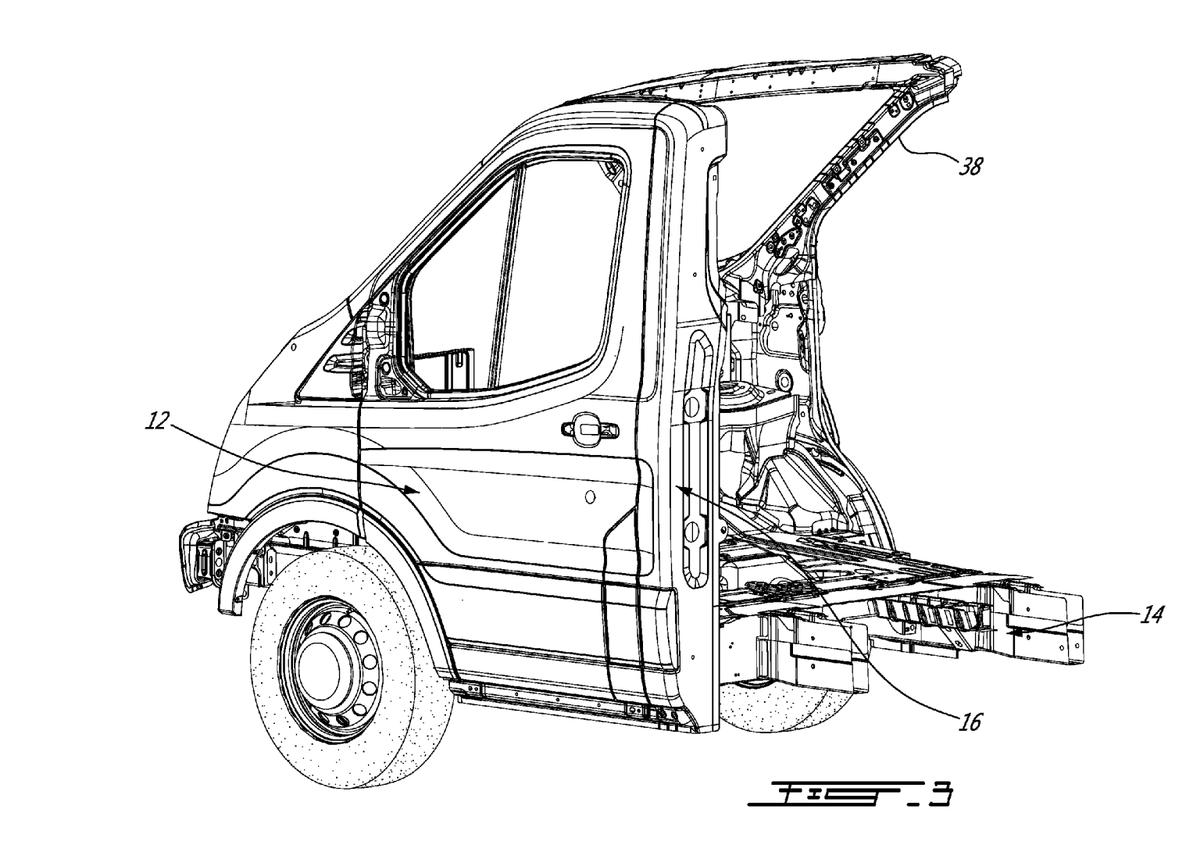
FIG. 3 shows a cabin of a bus without B pillar on the passenger side thereof, according to an embodiment of an aspect of the present invention.
Figure 4:
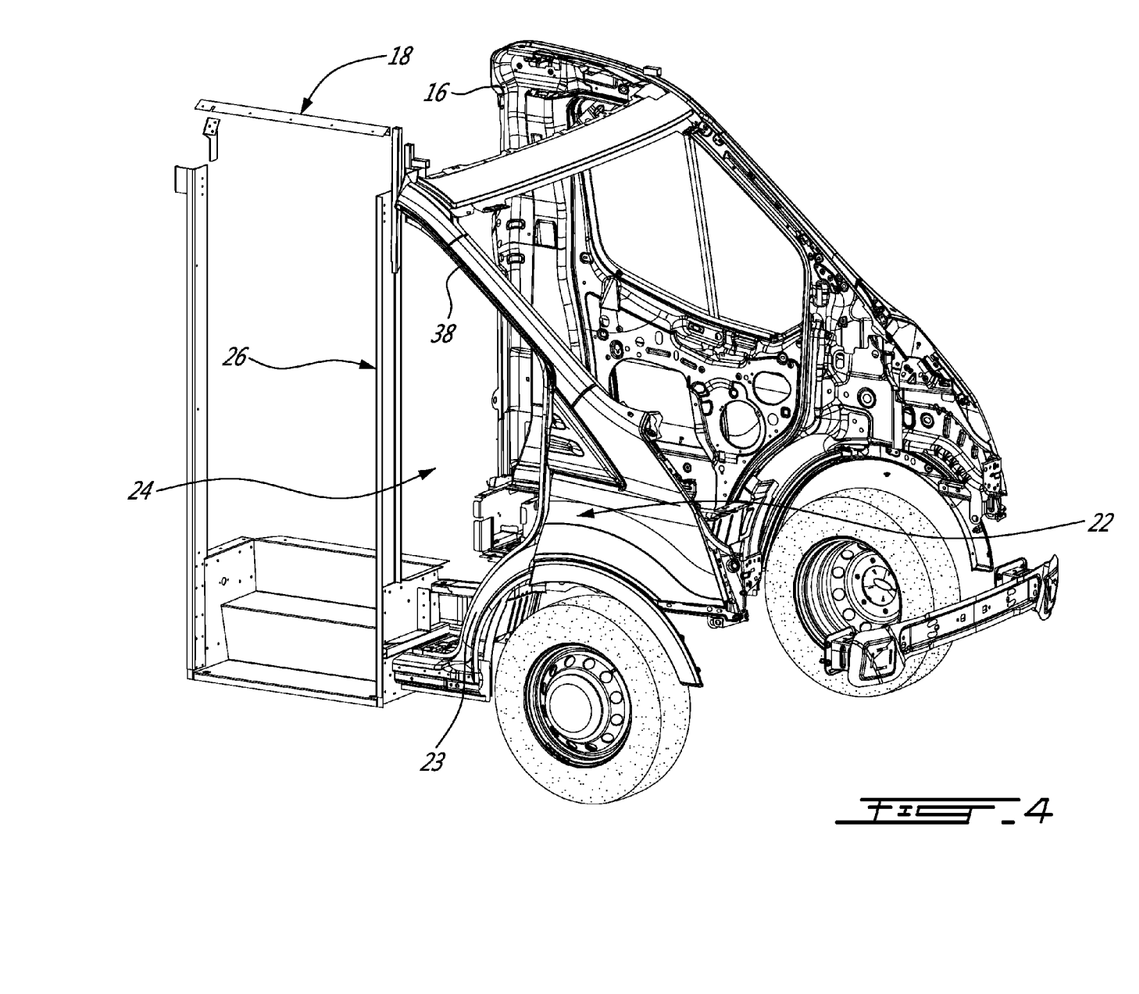
FIG. 4 shows an opening between a dual opening door (DOD) and the right front fender of the cabin of FIG. 3 according to an embodiment of an aspect of the present invention.
Figure 5:
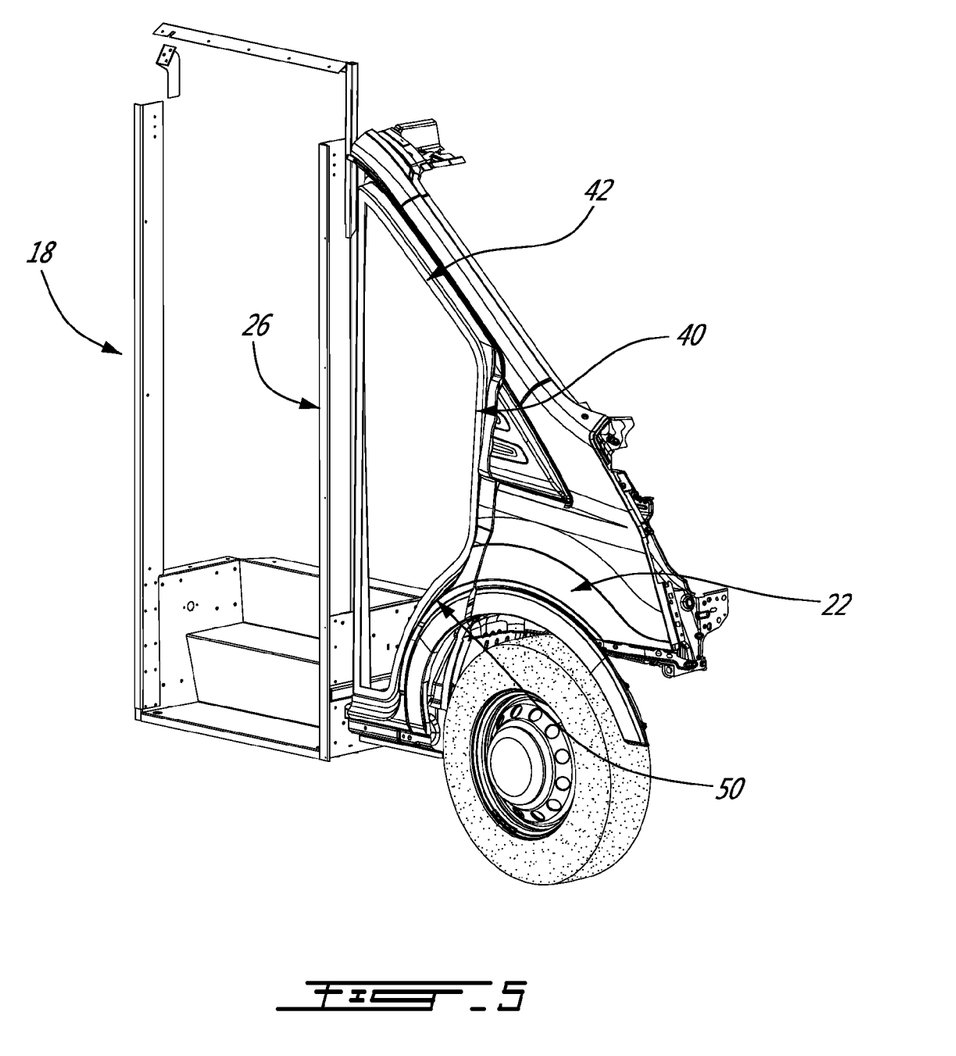
FIG. 5 shows a window frame of an assembly according to an embodiment of an aspect of the present invention.
Figure 6:
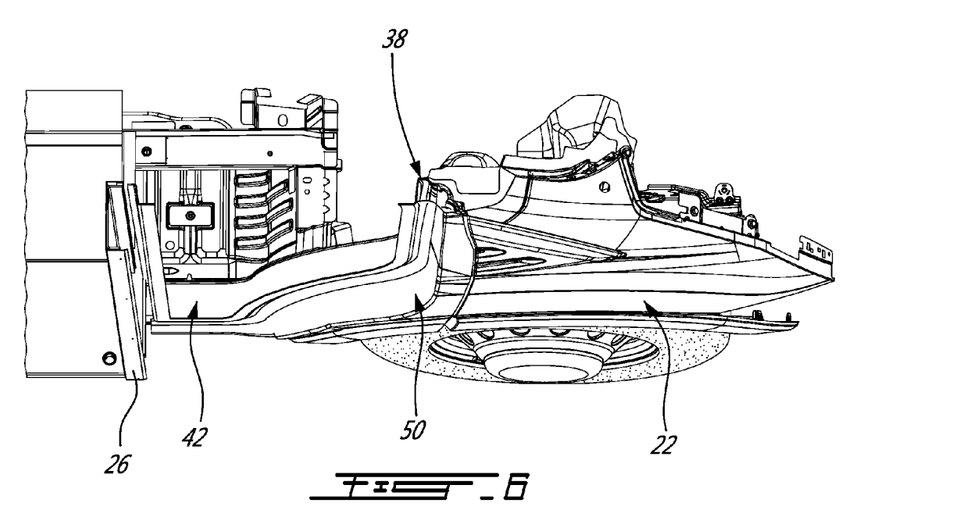
FIG. 6 shows a top cut away view of attachment of a window frame to the chassis, for an assembly according to an embodiment of an aspect of the present invention.

FIG. 3 shows a cutaway chassis according to an aspect of the present invention, comprising a cabin 12 and a chassis window frame rail 14. The cabin 12 comprises a B pillar on the driver's side and a driver's door (see FIGS. 3, 4, 10B). On the opposite side, the internal edge 38 of the cabin 12 forms an opened shape on generally three sides (see FIG. 3).

Figure 9:
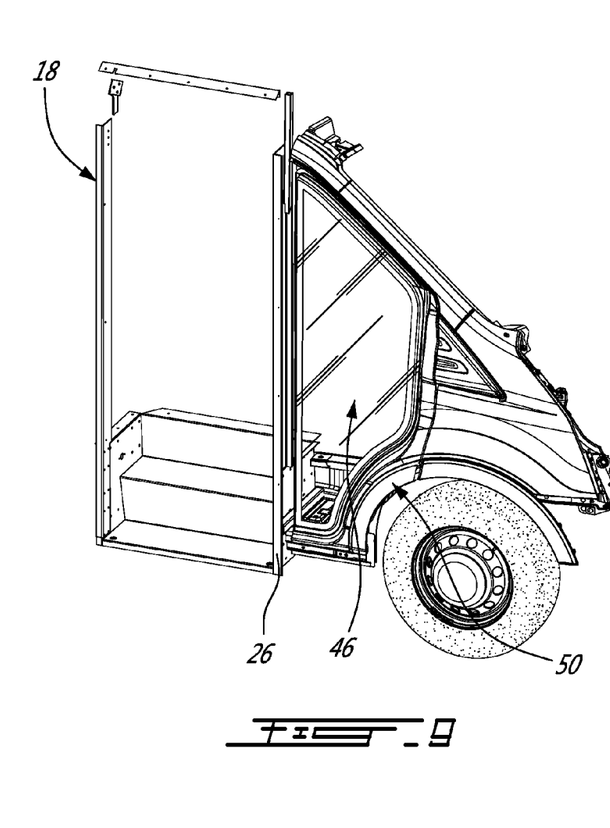
FIG. 9 shows an assembly according to another embodiment of an aspect of the present invention.
Figure 10A:
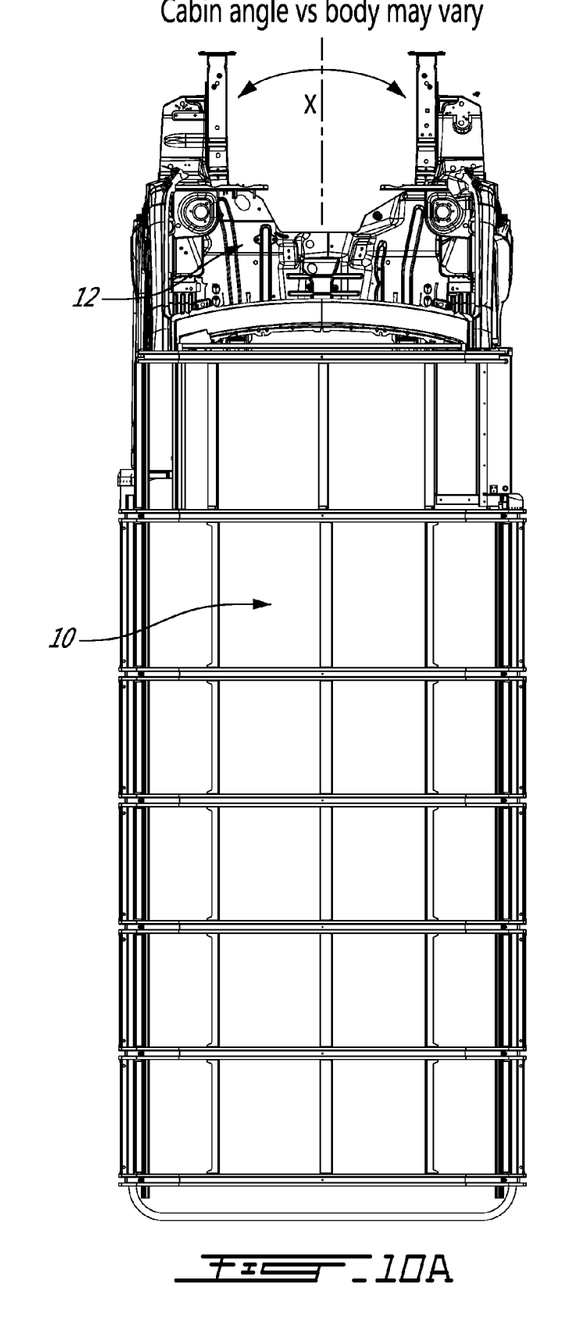
FIG. 10A shows a top diagrammatic view of a cabin and body of a vehicle according to an embodiment of an aspect of the present invention.
Figure 10B:
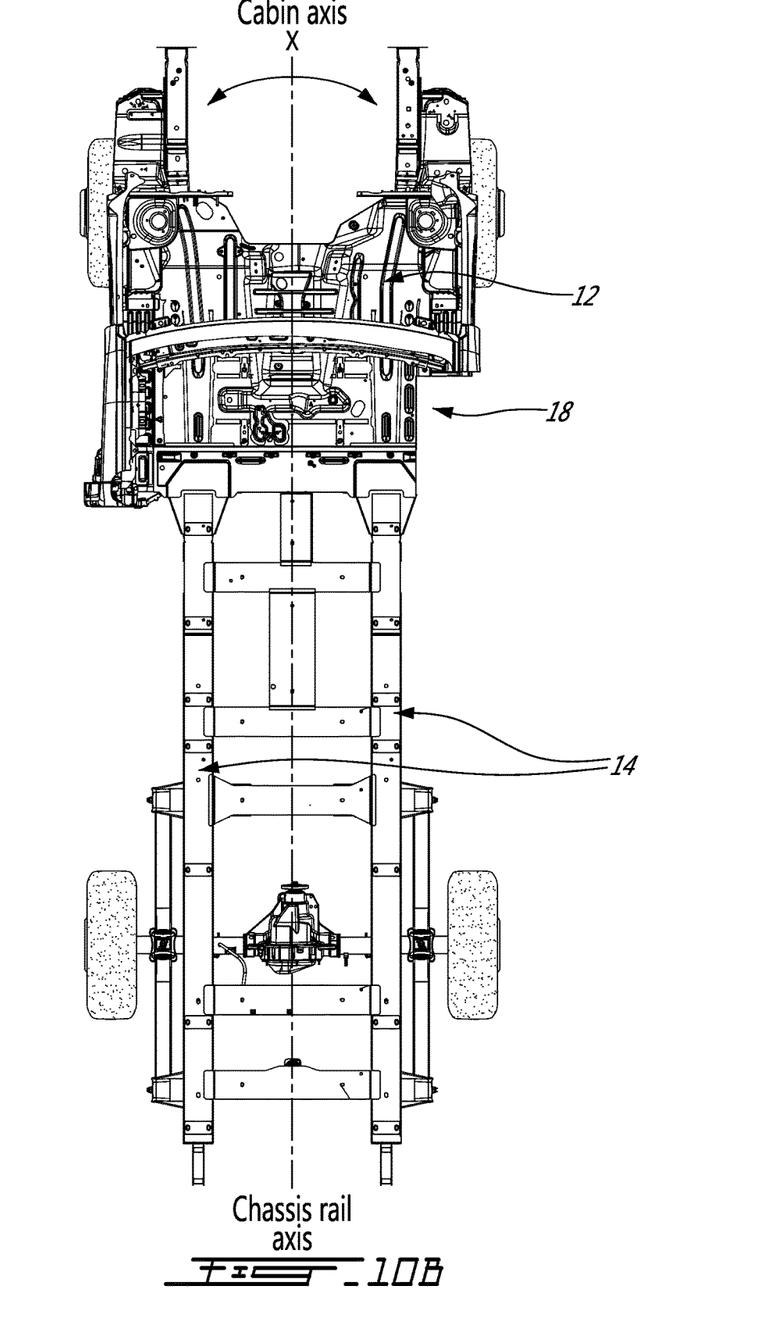
FIG. 10B shows the chassis rails of a vehicle according to an embodiment of an aspect of the present invention.
Figure 11:
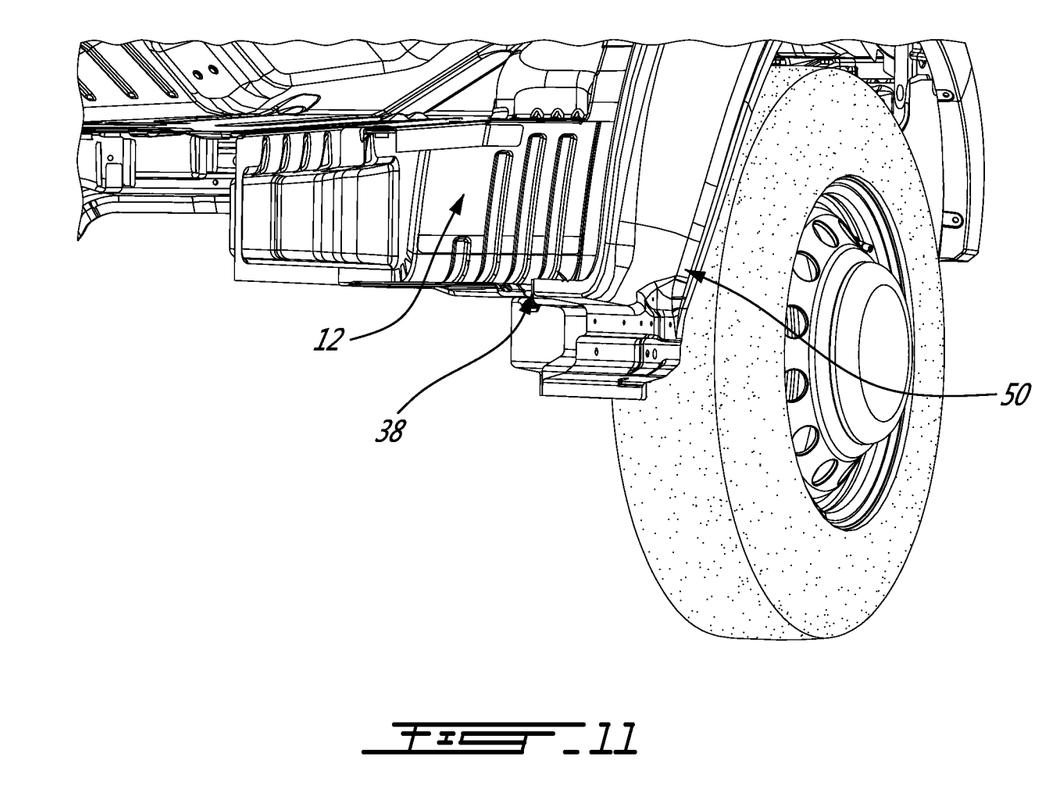
FIG. 11 shows details of a bottom part of an assembly according to an embodiment of an aspect of the present invention.

A body 10 with a door 18 integral therewith opposite the driver's side (see FIGS. 4, 5, 8, 9, door 18 shown only), is then positioned centred with the cabin (see FIG. 10A, typically aligned with the chassis rail axis (see FIG. 10B). The front post 26 of the door 18 forms the fourth side of an opening 24 between the front fender 22 of the cabin 12 on the passenger side and the post 26 of the door 18, the other sides of the opening 24 being formed by the internal edge 38 of the cabin 12 (see FIG. 4).

As people in the art will appreciate, this opening 24 may vary in size depending on the misalignment between the cabin 12 and the chassis window frame rail 14 (see FIG. 10B).

A window assembly 40 according to an embodiment of an aspect of the present invention is shown in FIGS. 5 to 10 for example.

Figure 7:
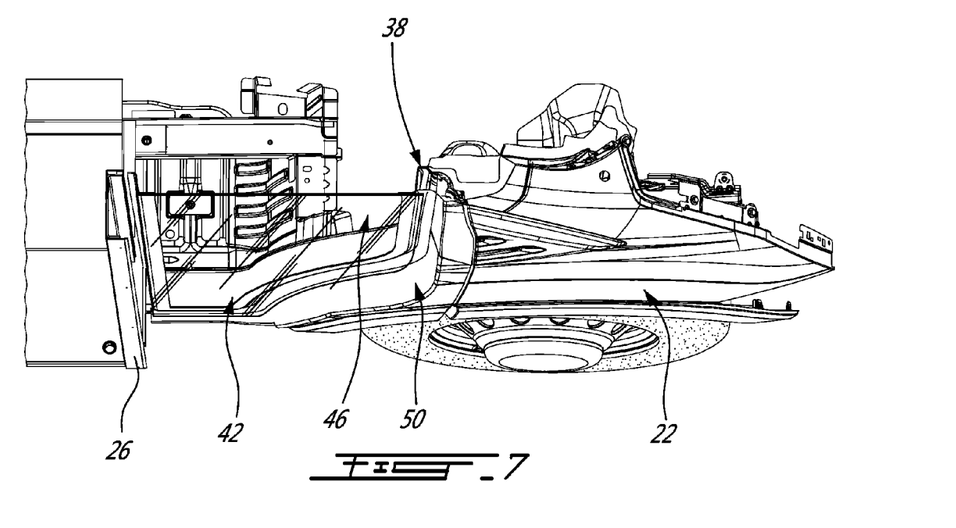
FIG. 7 shows a top cut away view of an assembly according to an embodiment of an aspect of the present invention.
Figure 8:
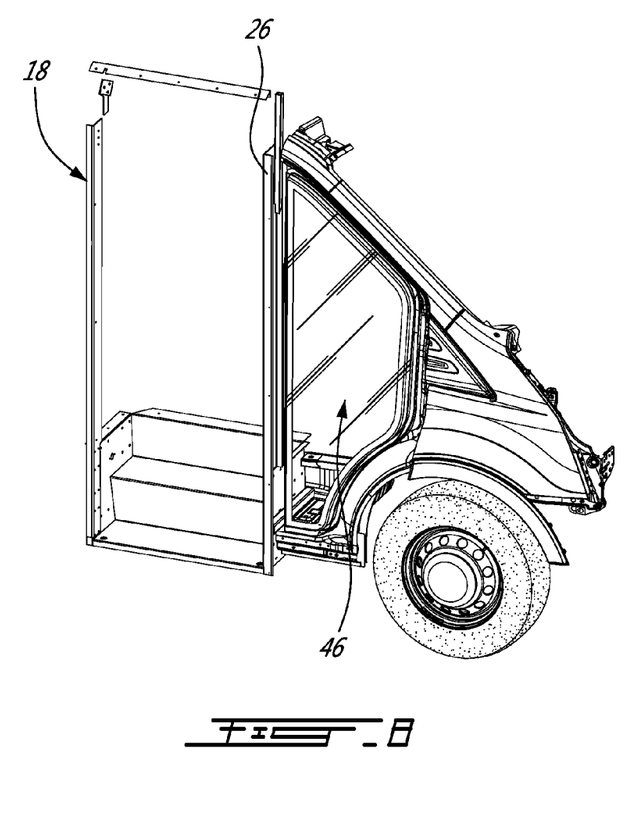
FIG. 8 shows an assembly according to an embodiment of an aspect of the present invention.

The window assembly 40 comprises a one-piece window frame 42, made in a composite, secured within the opening 24, and enclosing a glazing 46 (see FIGS. 7-9). The internal surface of the lateral members of the window frame 42, i.e. the surfaces of the window frame 42 facing towards the inside of the vehicle, may have a class A white gel coat finish for example. The external surface of the lateral members of the window frame 42, i.e. the surface of the sides of the window frame 42 facing outwards of the vehicle, may have an original composite finish, such as fiber and resin without coating, for example.

For installation, an adhesive is applied on the edges of the opening 24, i.e. on the internal edge 38 of the cabin 12 and on the door front post 26 facing the opening 24, then the window frame 42 is introduced by the inside of the cabin 12 within the opening 24, and is glued on all edges thereof, to the internal edge 38 of the cabin 12 and on the door front post 26. Once the window frame 42 is thus fitted between the door front post 26 and the internal edge 38 of the cabin 12, a glass adhesive is applied on the external surfaces of its sides, i.e. its surfaces facing outwards of the vehicle, and a glazing 46 is centrally positioned and glued on these external surfaces, from the outside of the vehicle. No gasket is needed. When the window assembly 40 is thus installed, water tightness is achieved and the opening 24 between the door front post 26 and the internal edge 38 of the cabin is filled with the see-through glazing 46, thereby reducing blind-spots and allowing enhanced visibility when loading and unloading passengers.

Once installed, the window assembly 40 rests on the internal edge 38 of the cabin 12; there is no contact between the window assembly 40 and the internal fender panel 23 or the fender 22 of the cabin. As a result, as the window frame 42 and the window assembly 40 as a whole is independent of the internal fender panel 23 and of the fender 22 of the cabin, the window assembly 40 is not affected by geometrical or angular variations of the chassis discussed hereinabove in relation to FIG. 10.

Installation and sealing of the window frame 42 within the opening by the interior of the cabin 12 using an adhesive, i.e. large bonding surfaces, provides enhanced rigidity and strength to the window assembly. Moreover, as the window frame 42 is installed from the inside of the cabin 12, the window assembly 40 is prevented from falling outwards of the vehicle.

The structure of the window assembly 40 allows an improved process control. Once the window assembly 40 is installed as described hereinabove, water tightness is ensured and any water reaching the window assembly from the outside of the vehicle is directed to the bottom thereof, without being trapped as may occur in a multiple-part structure as known in the art.

A transition member 50 may be added between the window assembly 40 and the front fender 22 for aesthetic purpose for example, as shown in FIG. 9.

A thermoplastic material, such as Popelen™ for example, may be used, for its impact and abrasion resistance as this member is in close proximity of the front wheel and therefore exposed to particle projection from the road for example. The transition member 50 may be easily removed and replaced.

Figure 12A:
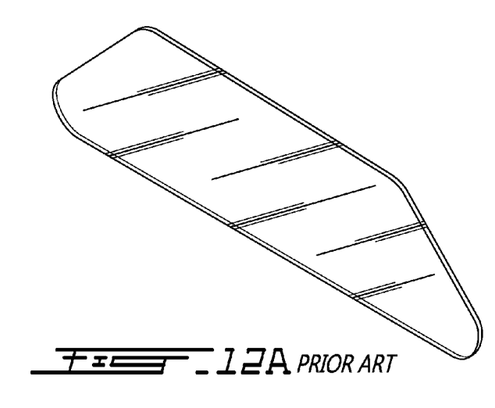
FIG. 12A shows a glazing of a window assembly of a GM SRW as known in the art.
Figure 12B:
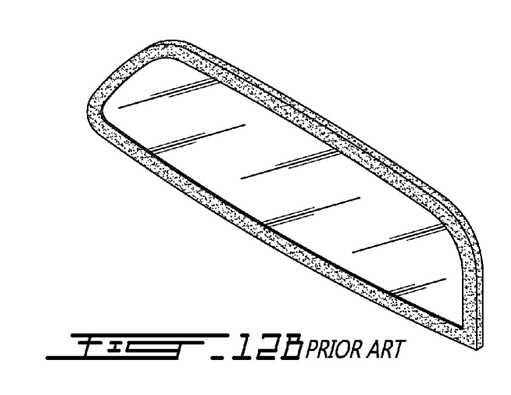
FIG. 12B shows a glazing of a window assembly of GM DRW as known in the art.
Figure 12C:
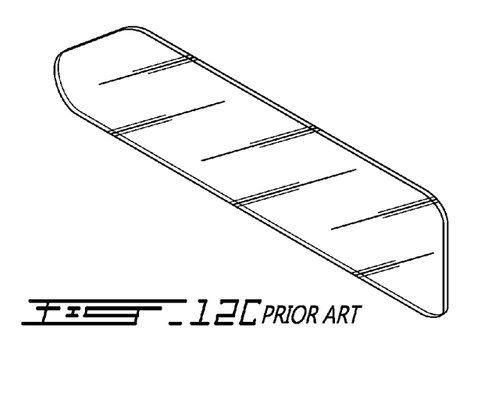
FIG. 12C shows a glazing of a window assembly of Ford SRW as known in the art.
Figure 12D:
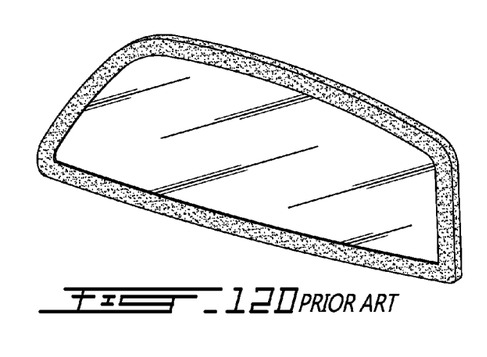
FIG. 12D shows a glazing of a window assembly of a Ford DRW as known in the art.

The window assembly 40 allows maximizing the available see-through surface area and reducing blind spot. The see-through surface area has been shown to be significantly increased compared to window assemblies as known in the art as follows for example: 45% higher than the GM SRW shown in FIG. 12A; 17% higher than the GM DRW shown in FIG. 12B; 97% higher than the Ford SRW shown in FIG. 12C; and 91% higher than the Ford DRW shown in FIG. 12D.

The scope of the claims should not be limited by the embodiments set forth in the examples, but should be given the broadest interpretation consistent with the description as a whole.

The invention claimed is:

1. A side window assembly for a vehicle comprising a cabin, a chassis window frame rail, and a body with a door integral therewith and aligned with the chassis rail axis, comprising:
    a window frame, fitted within an opening between a front post of the door and an internal edge of the cabin independently of an internal fender panel and of a fender of the cabin; and
    a glazing, secured to an external surface of the window frame and spanning said opening.

2. The side window assembly of claim 1, wherein said window frame is a one-piece window frame.

3. The side window assembly of claim 1, wherein said window frame is made in a composite material.

4. The side window assembly of claim 1, wherein said window frame is secured to the internal edge of the cabin and to the front door post using an adhesive.

5. The side window assembly of claim 1, wherein said cabin comprises a B pillar on a first side thereof, and is opened on an opposite side thereof with said internal edge forming generally three sides of said opening, said front post of the door forming a fourth side of said opening.

6. A method for installing a window assembly in a vehicle comprising a cabin having an internal edge forming generally three sides of an opening, a chassis window frame rail, and a body with a door integral therewith and aligned with the chassis rail axis, a front post of the door forming a fourth side of the opening, the method comprising:
   a) securing a window frame within the opening between the front post of the door and the internal edge of the cabin, independently of an internal fender panel and of a fender of the cabin; and
   b) securing a glazing to an external surface of the window frame, the glazing spanning the opening.

7. The method of claim 6, wherein said step a) comprises applying an adhesive on edges of the opening; and positioning the window frame within the opening by the inside of the cabin; and said step b) comprises applying an adhesive on external surfaces of the window frame and centrally positioning the glazing on the external surfaces of the window frame from the outside of the cabin.

8. The method of claim 6, further comprising positioning a transition member between the window assembly and a front fender of the cabin.

9. A vehicle comprising a cutaway chassis comprising a cabin and a chassis window frame rail, and a body generally aligned with the chassis rail axis, the cabin comprising a B pillar on a first side of the vehicle, an internal edge of the cabin forming sides of an opening on an second side of the vehicle opposite the first side of the vehicle, the body comprising a door integral therewith on said second side of the vehicle, a front post of the door closing said opening, the vehicle further comprising a one-piece window frame secured to said front post and to said internal edge of the cabin within said opening, independently of an internal fender panel and of a fender of the cabin, and supporting a glazing spanning said opening.

10. The side window assembly of claim 1, wherein said cabin is opened on a side, with said internal edge forming generally three sides of said opening and said front post of the door forming a fourth side of said opening.

* * * * *